(12) United States Patent
Francescon et al.

(10) Patent No.: US 7,984,632 B2
(45) Date of Patent: Jul. 26, 2011

(54) METHOD FOR SYNCHRONIZING THE BI-DIRECTIONAL TRANSMISSION OF DATA

(75) Inventors: Massimo Francescon, Turin (IT); Josef Siraky, Donaueschingen (DE); Ulrich Armbruster, Donaueschingen (DE)

(73) Assignee: Sick Stegman GmbH, Donaueschingen (DE)

( * ) Notice: Subject to any disclaimer, the term of this patent is extended or adjusted under 35 U.S.C. 154(b) by 1111 days.

(21) Appl. No.: 11/798,181

(22) Filed: May 10, 2007

(65) Prior Publication Data

US 2007/0263589 A1 Nov. 15, 2007

(30) Foreign Application Priority Data

May 11, 2006 (DE) .................. 10 2006 022 284

(51) Int. Cl.
*H04J 3/00* (2006.01)
*H04J 3/06* (2006.01)
(52) U.S. Cl. ............................ 70/280; 370/347; 370/350
(58) Field of Classification Search .................. 370/252, 370/294, 321, 336, 337, 347, 348, 436, 442, 370/503, 508, 509, 520, 340, 341, 276, 280
See application file for complete search history.

(56) References Cited

U.S. PATENT DOCUMENTS

| | | | | |
|---|---|---|---|---|
| 3,946,161 A * | 3/1976 | Husted et al. | | 370/505 |
| 5,177,765 A * | 1/1993 | Holland et al. | | 375/368 |
| 5,428,603 A | 6/1995 | Kivett | | |
| 5,515,062 A * | 5/1996 | Maine et al. | | 342/457 |
| 6,256,505 B1 * | 7/2001 | Kingdon et al. | | 455/456.2 |
| 6,996,088 B1 * | 2/2006 | Kroon et al. | | 370/341 |
| 7,099,422 B2 * | 8/2006 | Hoctor et al. | | 375/354 |
| 7,285,948 B2 * | 10/2007 | Tran et al. | | 324/158.1 |
| 7,418,372 B2 * | 8/2008 | Nishira et al. | | 703/2 |
| 2002/0122557 A1 * | 9/2002 | Aihara et al. | | 380/261 |
| 2005/0169413 A1 | 8/2005 | Van Der Putten et al. | | |

FOREIGN PATENT DOCUMENTS

| | | |
|---|---|---|
| DE | 196 26 287 | 2/1997 |
| DE | 101 10 675 | 10/2002 |
| EP | 0 100 386 | 2/1984 |
| EP | 0 485 879 | 5/1992 |
| EP | 0 902 546 | 3/1999 |
| EP | 1 434 382 | 6/2004 |
| WO | 95/14241 | 5/1995 |

* cited by examiner

*Primary Examiner* — Hassan Kizou
*Assistant Examiner* — Roberta A Shand
(74) *Attorney, Agent, or Firm* — The Nath Law Group; Jerald L. Meyer; Robert T. Burns

(57) ABSTRACT

The invention relates to a method for synchronizing a bi-directional transmission of data between a transmitter and a receiver based on the transmission of frames (10) having a predefined bit length, with a predefined first bit length (20) being provided in each frame (10) for the transmission of data from the transmitter to the receiver and a predefined second bit length (30) for the transmission of data from the receiver to the transmitter, with a trigger pulse (40) being sent to the receiver parallel to and independently from the transmission of the data between the transmitter and receiver, which pulse triggers a data collection process at the receiver, wherein the frame (10) has a time slot (50), during which no information is transmitted from the transmitter to the receiver and also not from the receiver to the transmitter, and wherein the trigger pulse (40) is transmitted from the transmitter to the receiver during this time slot (50).

20 Claims, 1 Drawing Sheet

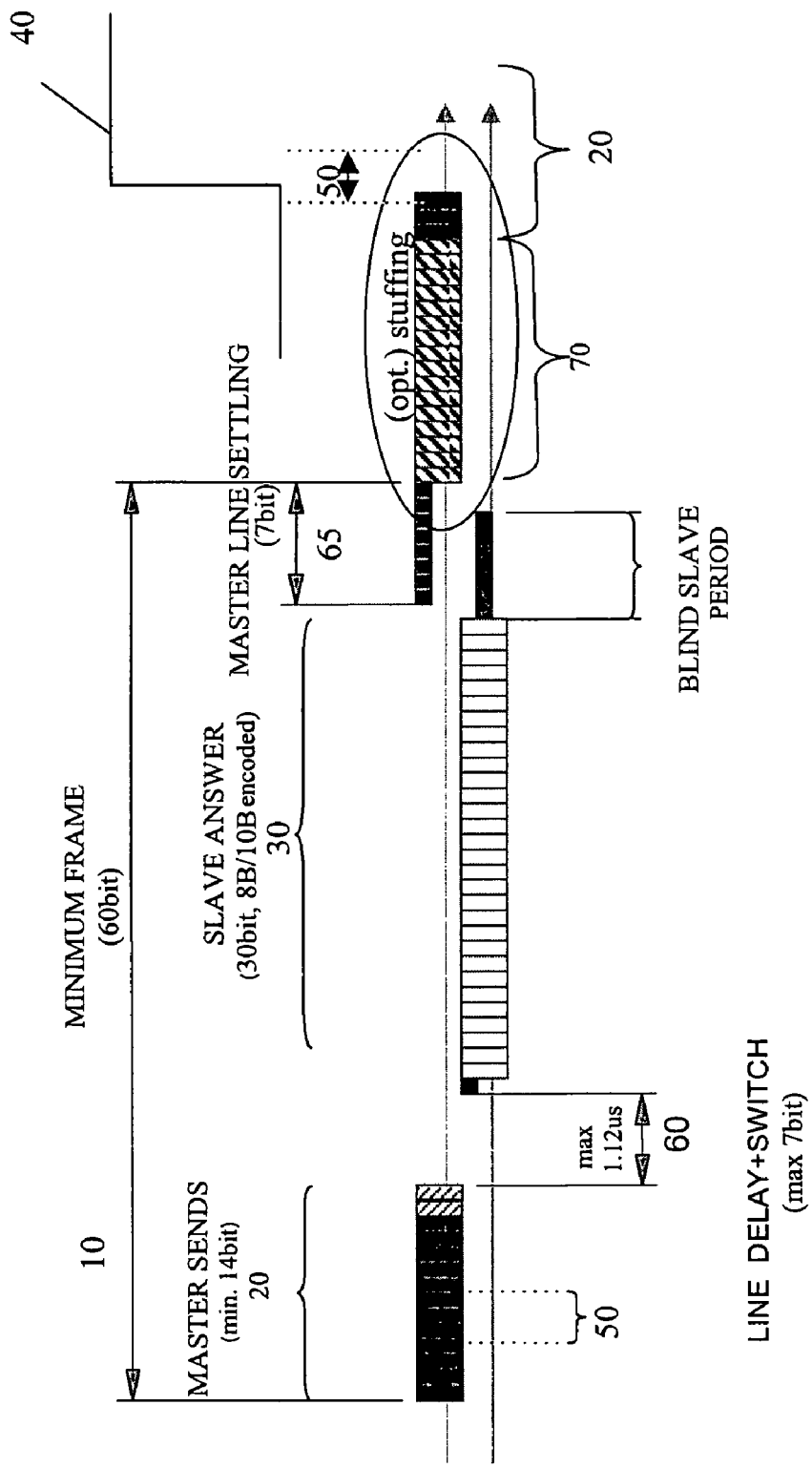

METHOD FOR SYNCHRONIZING THE BI-DIRECTIONAL TRANSMISSION OF DATA

The present subject matter relates to a method for synchronizing the bi-directional transmission of data in accordance with the exemplary embodiments disclosed below.

Methods are known for the bi-directional transmission of data, according to which data is transmitted between a transmitter and a receiver. These methods are based on the transmission of frames having a predefined bit length, wherein in each frame a predefined first bit length is provided for transmitting data from the transmitter to the receiver and a predefined second bit length for transmitting data from the receiver to the transmitter. For example, in the first bit length a transmitter may request data from the receiver, which data the receiver then transmits to the transmitter in the second bit length. Parallel to this process, independently from the method for the bi-directional transmission of data, a trigger pulse is transmitted from the transmitter to the receiver, which is used to trigger a collection of data at the receiver's end, for example the collection of the data subsequently to be transmitted to the transmitter. The trigger pulse is completely independent from the data transmission between the transmitter and the receiver and in particular it is not precisely adjusted to the frame length with respect to its pulse length. According to the familiar methods, the trigger pulse is digitized and then transmitted, wherein as a result of the digitization temporal inaccuracies may occur in the length of a bit, for example approximately 1 µs. Such temporal inaccuracies, however, are unacceptable for many applications, for example for high-resolution position measurements using an encoder.

It is therefore the object of the invention to provide a method, which enables highly precise synchronization between the trigger pulse and the data transmission between the transmitter and the receiver.

The object of the present subject matter is achieved by a method with the characteristics according to the exemplary embodiments disclosed below.

Advantageous embodiments and further developments of the invention are disclosed in the dependent claims.

The method according to the invention for synchronizing the bi-directional transmission of data between a transmitter and a receiver, based on the transmission of frames having a predefined bit length, is characterized in that the frame has a time slot, during which data is neither transmitted from the transmitter to the receiver nor from the receiver to the transmitter, and that the trigger pulse during this time slot is transmitted from the transmitter to the receiver. Consequently, the digitization of the trigger pulse can be eliminated because the trigger pulse can be transmitted to the receiver directly within the time slot. As a result, temporal inaccuracy caused by the digitization process is avoided, and precise synchronization between the trigger pulse and the data collection by the receiver is guaranteed, since the data collection is performed without time delay precisely at the time at which the edge of the trigger pulse reaches the receiver, which delay would be caused by the digitization of the trigger pulse and the transmission of the trigger pulse, which occurs independently of the data transmission.

It is preferable if the length of the time slot ranges between 3 and 8 bits. This provides a sufficiently long time window, during which the trigger pulse, particularly the edge of the trigger pulse triggering the data collection at the receiver, can be transmitted.

Advantageously, the first bit length and the second bit length are provided in the frame separated by several time delay bits, preferably 4 to 7 time delay bits. In this way, it is prevented that the receiver will already attempt to transmit data to the transmitter while data is still being transmitted from the transmitter to the receiver.

According to an advantageous embodiment of the invention, the time slot within the frame is provided within the first bit length. This guarantees that no data is transmitted from the receiver to the transmitter, so that no additional time delay bits are required.

In general, the trigger pulse spacing is not precisely adjusted to a frame length. While in this case, during a first transmission of the trigger pulse, a transmission would occur within the provided time slot within the frame, the trigger pulse would shift within the time slot when several transmissions are to take place. To guarantee that the trigger pulse is also transmitted always within the provided time slot, even in the event of discrepancies between the trigger pulse spacing and the frame length, according to a particularly preferred embodiment of the invention one or more stuff bits are inserted, preferably directly before the first bit length, as a function of the trigger pulse spacing. The number of stuff bits to be inserted is defined by the shift of the trigger pulse position within the time slot between the preceding consecutive frames.

Advantageously, the stuff bits are inserted evenly distributed across several frames, particularly when a large number of stuff bits are required, so that substantially even data transmission can be guaranteed, despite the insertion of additional bits.

It is preferable if the number of stuff bits is greater than or equal to N, with N stuff bits replacing one synchronization frame, respectively. Such synchronization frames comprise additional information with respect to the synchronization between the transmitter and receiver, for example a predefined bit sequence, which the receiver recognizes and is able to use for further synchronization.

It is preferable if N is equal to 5 or 6, since a bit sequence of five or six bits is sufficient to exchange additional information with respect to the synchronization between the transmitter and receiver.

Typically, the length of the first bit length is at least 14 bits, the length of the second bit 30 bits. The length of a frame is at least 60 bits and no more than 120 bits, depending on the number of stuff bits that have been inserted.

The data is preferably exchanged between a controller of the transmitter and measuring units of the receiver, wherein the measuring units in a particularly preferred embodiment are configured as position measuring units, since particularly for the determination of positions, for example with rotary encoders, high accuracy and exact synchronization is required between the trigger pulse and the data transmission between the transmitter and the receiver.

The system according to the present subject matter comprises a transmitter and a receiver, between which data is transmitted bi-directionally, wherein the transmission of the data is carried out with the method according to one or more of the disclosed exemplary embodiments. In certain exemplary embodiments, it is preferable if the data is exchanged between a controller of the transmitter and measuring units of the receiver, wherein particularly the measuring units are configured as position measuring units, preferably as rotary encoders.

The invention will be explained hereinafter by way of example with reference the description of the FIGURES, wherein:

FIG. 1 is a schematic illustration of a frame according to the invention.

FIG. 1 shows a frame 10 having a regular and therefore minimum bit length of 60 bits. Within the frame 10, at the beginning of the frame a first bit length 20 is provided, which typically has a length of at least 14 bits and is intended to transmit data from a transmitter to a receiver. This may be, for example, a request for data.

Within the frame 10, data is transmitted bi-directionally. The first bit length 20 is followed by a second bit length 30, which typically has a length of 30 bits and is intended to transmit data from the receiver to the transmitter. In this second bit length, for example, the data requested by the transmitter is transmitted from the receiver to the transmitter. The second bit length 30 is shown graphically vertically offset from the first bit length 20 to illustrate that in this case the data is transmitted in the opposite direction via the data line.

Advantageously, the first bit length 20 and the second bit length 30 are separated by several time delay bits 60, preferably by four to no more than seven time delay bits 60, which ensure that the transmission of data from the receiver to the transmitter and the transmission of data from the transmitter to the receiver do not overlap. Seven time delay bits 60 correspond to a time delay of 1.12 µs.

The second bit length 30 is again followed by several time delay bits 65, preferably four to no more than seven time delay bits 65, in order to exclude the data transmissions from intersecting.

Within the first bit length 20 a time slot 50 is provided, within which no data is transmitted from the transmitter to the receiver, and also not vice versa, however within which the trigger pulse, particularly the edge of the trigger pulse, is transmitted directly from the controller of the transmitter to the receiver. Consequently, a digitization of the trigger pulse can be eliminated, which could result in a time delay. In this way, exact synchronization is guaranteed between the trigger pulse and the data collection by the receiver triggered by the trigger pulse. The length of the time slot 50 is approximately 3 to 8 bits in order to guarantee transmission of the trigger pulse 40 still within the time slot 50, even in the event of possible shifts of the trigger pulse 40 within the time slot 50. The length of the first bit length 20 therefore increases from regularly 14 bits by the corresponding number of bits for the time slot 50, for which reason the length of the first bit length 20 is listed as "at least 14 bits".

When the distance of the trigger pulses 40 and the length of the frame 10 have been precisely adjusted to each other, the edge of the trigger pulse 40 within each frame 10 is transmitted relative to the frame 10 on the same position within the time slot 50. However, since the trigger pulse 40 is generated independently from the data transmission between the transmitter and the receiver, this is generally not the case. While during a first transmission of the trigger pulse 40 a transmission would be carried out within the provided time slot 50 inside the frame 10, following the transmission of several frames 10, however, the trigger pulse 40 would shift within the time slot 50, specifically compared to the transmission in the previous frame 10 it would take place sooner when the distance of the trigger pulses 40 is shorter than the length of the frame 10 and it would be later than the transmission in the previous frame 10 when the distance of the trigger pulses 40 is greater than the length of the frame 10. A comparison of the positions of the trigger pulses 40 in two consecutive frames 10 can therefore allow a conclusion of the differences between the distance of the trigger pulses 40 and the length of the frames 10. To guarantee that the trigger pulse 40 is always transmitted within the provided time slot 50, even in the event of variances between the distance of the trigger pulses 40 and the length of the frames 10, one or more stuff bits 70 are inserted directly before the first bit length 20 as a function of the distance of the trigger pulses 40. The number of stuff bits 70 to be inserted is hereby defined by the shift of the position of the trigger pulse 40 within the time slot 50 between the preceding consecutive frames 10, since the position of the edge of the trigger pulse 40 relative to the frame 10 within the time slot 40 is known from the preceding frames 10 and at the same time the amount by which the position of the edge of the trigger pulse 40 has shifted is also captured. At a maximum, however, the number of stuff bits 70 to be inserted is equivalent to the number of bits that the frame 10 contains, in the present case 60. Such a high number of stuff bits 70 is required when the position of the edge of the trigger pulse 40 within the time slot 50 is slightly sooner than expected compared to the previous frame 10. When, for example, this many stuff bits 70 must be inserted, they are preferably evenly distributed across several frames 10. When, for example, fifty stuff bits 70 must be inserted, these are preferably not inserted before the subsequent first bit length 20 as one block of fifty stuff bits 70, but for example into five consecutive frames 10 in blocks of ten stuff bits 70 each or into ten consecutive frames 10 in blocks of five stuff bits 70 each, in order to guarantee substantially even data transmission, even when inserting a large number of stuff bits 70.

So as to use the stuff bits 70 also for the transmission of usage information, N stuff bits 70 are replaced with a synchronization frame as soon as the number of stuff bits 70 is greater than or equal to N. Such synchronization frames comprise additional information with respect to the synchronization between the transmitter and receiver, for example a predefined bit sequence, which the receiver recognizes and is able to use for further synchronization. This predefined bit sequence should have the maximum possible number of bit value changes and no constant component in order to guarantee the most reliable transmission and detection of the bit sequence by the receiver as well as the most precise synchronization possible. It is preferable if N is equal to 5 or 6, since a bit sequence of five or six bits is sufficient to exchange additional information with respect to the synchronization between the transmitter and receiver.

The method is preferably used for the transmission of data between a controller of the transmitter and measuring units of the receiver. In particular, the measuring units are configured as position measuring units. Particularly for position measuring units, such as rotary encoders, the time requirements are especially high in order to guarantee exact position determination, so that in this case the exact synchronization between the trigger pulse and data transmission between the transmitter and receiver is particularly advantageous.

The invention claimed is:

1. A method for synchronizing a bi-directional transmission of data between a transmitter and a receiver based on the transmission of frames having a predefined bit length, with a predefined first bit length being provided in each frame for the transmission of data from the transmitter to the receiver and a predefined second bit length for the transmission of data from the receiver to the transmitter, with a trigger pulse being sent from the transmitter to the receiver parallel to and independently from the transmission of the data between the transmitter and receiver, which pulse triggers a data collection process at the receiver, characterized in that the frame has a time slot, during which no information is transmitted from the transmitter to the receiver and also not from the receiver to the transmitter, and that the trigger pulse is transmitted from the transmitter to the receiver in non-digitized form during this time slot.

2. The method according to claim 1, characterized in that the length of the time slot is 3 to 8 bits.

3. The method according to claim 1, characterized in that the first bit length and the second bit length are provided in the frame separated by some time delay bits.

4. The method according to claim 1, characterized in that the time slot within the frame is provided within the first bit length.

5. The method according to claim 1, characterized in that one or more stuff bits are inserted depending on the trigger pulse length.

6. The method according to claim 5, characterized in that the stuff bits are inserted evenly distributed across several frames.

7. The method according to claim 5, characterized in that N stuff bits are replaced with one synchronization frame when the number of the stuff bits is greater than or equal to N.

8. The method according to claim 7, characterized in that N is equal to 5 or 6.

9. The method according to claim 1, characterized in that the length of the first bit length is at least 14 bits.

10. The method according to claim 1, characterized in that the length of the second bit length is at least 30 bits.

11. The method according to claim 1, characterized in that the length of a frame is at least 60 bits and no more than 120 bits.

12. The method according to claim 1, characterized in that the data are exchanged between a controller of the transmitter and measuring units of the receiver.

13. The method according to claim 12, characterized in that the measuring units are configured as position measuring units.

14. The method according to claim 13, characterized in that the position measuring units are configured as rotary encoders.

15. A system comprising a transmitter and a receiver, between which data are transmitted bi-directionally, wherein the transmission of the data is carried out with the method according to claim 1.

16. The system according to claim 15, characterized in that the data are exchanged between a controller of the transmitter and measuring units of the receiver.

17. The system according to claim 16, characterized in that the measuring units are configured as position measuring units.

18. The system according to claim 17, characterized in that the position measuring units are configured as rotary encoders.

19. The method according to claim 3, characterized in that the some time delay bits are 4 to 7.

20. The method according to claim 5, characterized in that one or more stuff bits are inserted directly before the first bit length.

* * * * *

UNITED STATES PATENT AND TRADEMARK OFFICE
CERTIFICATE OF CORRECTION

PATENT NO.       : 7,984,632 B2
APPLICATION NO.  : 11/798181
DATED            : July 26, 2011
INVENTOR(S)      : Massimo Francescon et al.

It is certified that error appears in the above-identified patent and that said Letters Patent is hereby corrected as shown below:

Please delete the following on the Title Page of the patent:

"(73) Assignee: Sick Stegman GmbH, Donaueschingen (DE)

replace with the following on the Title Page of the patent:

-- (73) Assignee: Sick Stegmann GmbH, Donaueschingen (DE) --

Signed and Sealed this
Fourth Day of October, 2011

David J. Kappos
*Director of the United States Patent and Trademark Office*